United States Patent
Mann et al.

(10) Patent No.: US 10,451,075 B1
(45) Date of Patent: Oct. 22, 2019

(54) SALTWATER DISPOSAL

(71) Applicant: Villicus, Inc., Midland, TX (US)

(72) Inventors: Bill Mann, Midland, TX (US); Russell Self, Edmond, OK (US)

(73) Assignee: Villicus, Inc., Midland, TX (US)

( * ) Notice: Subject to any disclaimer, the term of this patent is extended or adjusted under 35 U.S.C. 154(b) by 229 days.

(21) Appl. No.: 15/419,703

(22) Filed: Jan. 30, 2017

Related U.S. Application Data

(63) Continuation-in-part of application No. 14/301,110, filed on Jun. 10, 2014, now Pat. No. 10,138,882.

(60) Provisional application No. 62/288,781, filed on Jan. 29, 2016, provisional application No. 61/833,434, filed on Jun. 10, 2013.

(51) Int. Cl.

| | |
|---|---|
| *F04D 13/10* | (2006.01) |
| *F04D 1/06* | (2006.01) |
| *F04D 15/00* | (2006.01) |
| *E21B 41/00* | (2006.01) |
| *G05B 15/02* | (2006.01) |
| *E21B 43/16* | (2006.01) |
| *E21B 43/12* | (2006.01) |

(52) U.S. Cl.
CPC .......... *F04D 13/10* (2013.01); *E21B 41/0057* (2013.01); *F04D 1/06* (2013.01); *F04D 15/0066* (2013.01); *G05B 15/02* (2013.01); *E21B 43/128* (2013.01); *E21B 43/16* (2013.01)

(58) Field of Classification Search
CPC ........ F04D 13/10; F04D 15/0066; F04D 1/06; G05B 15/02; E21B 41/0057; E21B 43/128; E21B 43/16
See application file for complete search history.

(56) References Cited

U.S. PATENT DOCUMENTS

| | | | |
|---|---|---|---|
| 4,265,266 A | * | 5/1981 | Kierbow ............. G05D 11/132 137/101.19 |
| 4,830,218 A | | 5/1989 | Shirkhan |
| 4,867,633 A | | 9/1989 | Gravelle |
| 5,996,422 A | | 12/1999 | Buck et al. |
| 10,138,882 B1 | | 11/2018 | Self et al. |
| 2003/0219347 A1 | * | 11/2003 | Mascola ................. F01C 21/02 417/365 |
| 2005/0201882 A1 | | 9/2005 | Maccarrone et al. |
| 2006/0142692 A1 | | 6/2006 | Jacobson et al. |
| 2007/0114162 A1 | | 5/2007 | Stiles et al. |

(Continued)

*Primary Examiner* — Kenneth M Lo
*Assistant Examiner* — David J Wynne
(74) *Attorney, Agent, or Firm* — Hall Estill Attorneys at Law

(57) ABSTRACT

A saltwater disposal system and method that has a pump pod containing a plurality of individually controllable pumps. A tank pod contains a plurality of tanks connected to the pump pod to discharge fluid from the tanks by selected activation of the pumps. Each tank is configured to transmit a fluid level signal indicating a level of fluid in the respective tank. A flow controller executes computer instructions stored in a computer memory that defines a collective discharge flow rate for the tank pod from individual discharge flow rates for each tank based on a stored flow profile that varies discharge flow rate in relation to the tank fluid level signal. The flow controller also selectively activates the pumps according to predetermined operating rules to match a collective discharge flow rate of the pump pod to the discharge flow rate of the tank pod.

14 Claims, 10 Drawing Sheets

(56) References Cited

U.S. PATENT DOCUMENTS

| | | | |
|---|---|---|---|
| 2007/0175513 A1* | 8/2007 | McLoughlin | G05D 16/208 |
| | | | 137/87.02 |
| 2010/0150737 A1* | 6/2010 | Anderson | E21B 47/042 |
| | | | 417/44.1 |
| 2012/0102639 A1 | 5/2012 | Bovill et al. | |
| 2014/0064854 A1* | 3/2014 | Dudgeon | E21B 41/0057 |
| | | | 405/129.1 |
| 2014/0374089 A1* | 12/2014 | Coles | E21B 23/08 |
| | | | 166/250.01 |
| 2015/0233752 A1 | 8/2015 | Slade et al. | |
| 2016/0180475 A1 | 6/2016 | Phillips et al. | |
| 2016/0237789 A1 | 8/2016 | Hoffman et al. | |
| 2016/0355408 A1 | 12/2016 | Betts | |
| 2017/0009557 A1 | 1/2017 | Harman et al. | |

* cited by examiner

SALTWATER DISPOSAL

RELATED APPLICATIONS

The present application claims benefit of U.S. Provisional Patent Application Ser. No. 62/288,781 filed Jan. 29, 2016. The present application is also a continuation-in-part (CIP) of copending U.S. patent application Ser. No. 14/301,110 filed Jun. 10, 2014 which claims priority to U.S. Provisional Patent Application No. 61/833,434 filed Jun. 10, 2013.

SUMMARY

Some embodiments of this technology contemplate a saltwater disposal system that has a pump pod containing a plurality of individually controllable pumps. A tank pod contains a plurality of tanks connected to the pump pod to discharge fluid from the tanks by selected activation of the pumps. Each tank is configured to transmit a fluid level signal indicating a level of fluid in the respective tank. A flow controller executes computer instructions stored in a computer memory that defines a collective discharge flow rate for the tank pod from individual discharge flow rates for each tank based on a stored flow profile that varies discharge flow rate in relation to the tank fluid level signal. The flow controller also selectively activates the pumps according to predetermined operating rules to match a collective discharge flow rate of the pump pod to the discharge flow rate of the tank pod.

DETAILED DESCRIPTION

Initially, it is to be appreciated that this disclosure is by way of example only, not by limitation. The pump control concepts herein are not limited to use or application with any specific system or method that includes moving a fluid via a pump. Thus, although the instrumentalities described herein are for the convenience of explanation, shown and described with respect to exemplary embodiments, it will be appreciated that the principles herein may be applied equally in other types of systems and methods employing a pump.

Figure 1:
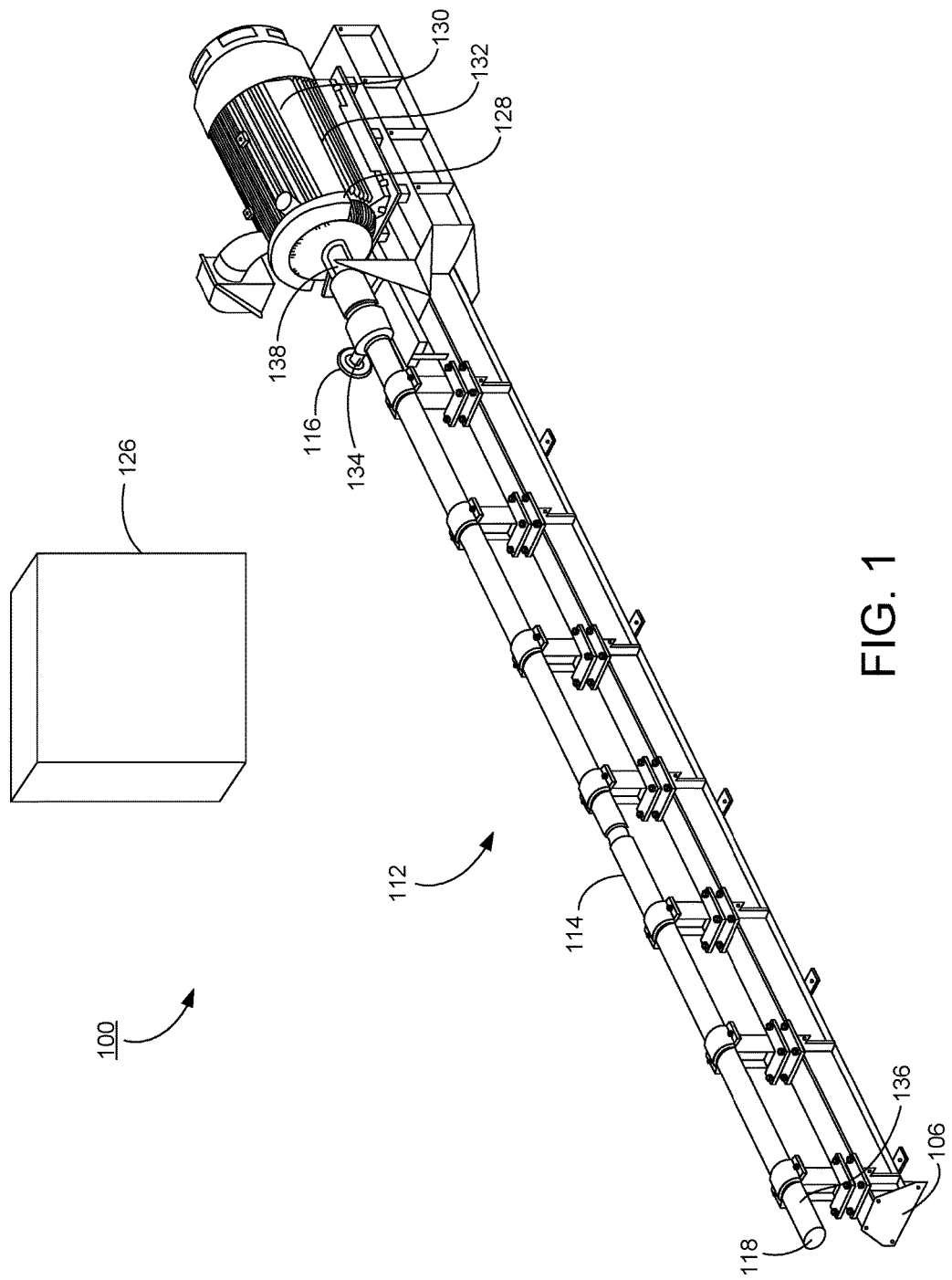
FIG. 1 is an isometric depiction of a portion of a horizontal pump system (HPS) that is constructed in accordance with embodiments of this technology.

Turning first to FIG. 1 which is an isometric depiction of a pumping system 100 that is constructed in accordance with illustrative embodiments of the present invention. The pumping system 100 includes a multistage centrifugal pump mounted horizontally at the surface, commonly referred to as a horizontal pumping system ("HPS"), although the contemplated embodiments are not so limited. In the field of oil and gas production technology, for example, fluids are routinely pressurized for various purposes such as production and handling. For example, an HPS is frequently used to transfer fluids within surface pipeline systems, and perhaps ultimately to inject the fluids into a wellbore. The multistage centrifugal pump can also be used in a vertical configuration within a wellbore, commonly referred to as an electric submersible pumping system ("ESPS"), primarily as a production pump for pumping fluids from the well to the surface pipeline systems. Although not depicted, the skilled artisan readily ascertains that the presently disclosed technology can also be used in an ESPS in equivalent alternative embodiments of the claimed invention.

Figure 2:
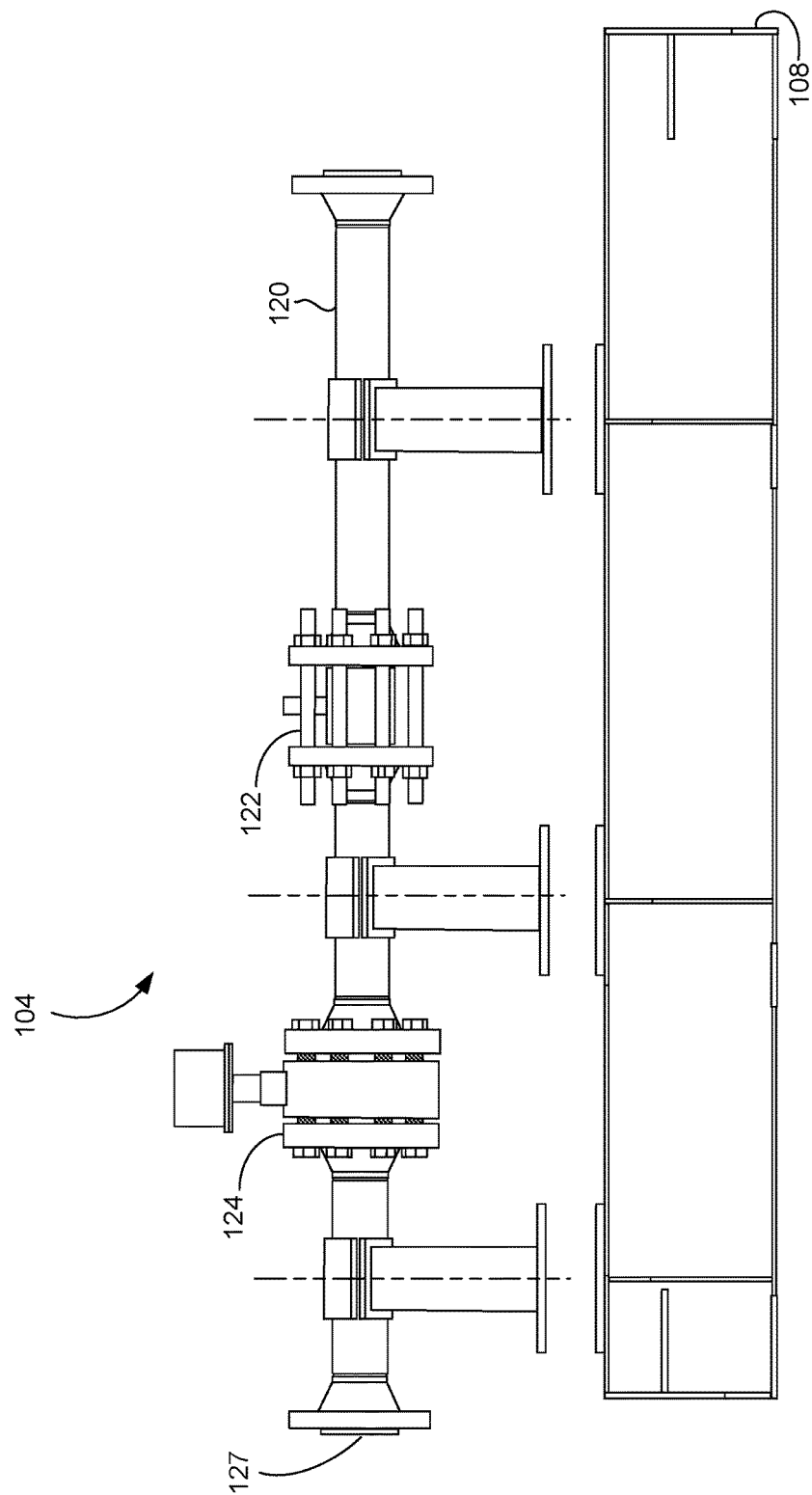
FIG. 2 is a flow control skid portion of the HPS of FIG. 1.

The pumping system 100 in the illustrative embodiments of FIG. 1 is generally part of a modular construction that joins a pump skid 102 with a flow control skid 104 (FIG. 2). Both skids have components supported upon a structural foundation, the skid, for transit and installation. The two skids 102, 104 are structurally connected together by attaching a distal bulkhead plate 106 of the pump skid 102 to a proximal bulkhead plate 108 of the flow control skid 104, such as bolting and/or welding the bulkhead plates 106, 108 together. This modular construction advantageously permits mixing and matching the skids so that a particular motor/pump configuration can be combined with one of a plurality of different flow control skids depending on what the particular flow control constraints are.

The pump skid 102 includes a motor 110 operating a pump 112 to pressurize a fluid inside the pump 112. In illustrative reduction to practice the motor 110 can be a 900 horsepower electric motor equipped with a variable speed control making it operable from about 30 hertz to about 90 hertz, corresponding to a speed range of about 1800 revolutions per minute to about 3500 revolutions per minute.

The pump 112 has an elongated cylindrical housing 114 enclosing a plurality of axially aligned pump stages. The housing 114 defines a suction-side inlet 116 to admit the fluid into the pump 112, and a discharge-side outlet 118 to pass the pressurized fluid out of the pump 112. Each stage includes an impeller that is rotated by the motor 110 with respect to a corresponding stationary diffuser. In order to obtain a desired pressure of the fluid at the outlet 118, an adequate number of the stages are stacked end-to-end within the housing 114 so that they cumulatively provide the desired outlet pressure.

The flow control skid 104 in FIG. 2 has a pipe 120 connected to the pump outlet 118 (FIG. 1) to direct the pressurized fluid through a flow meter 122. A flow control valve 124 is selectively position able to choke the flow to a desired flow rate and corresponding head pressure against which the pump 112 operates. The fluid exits the flow control skid 104 through an outlet 127.

In accordance with the present technology, a processor-based controller 126 (FIG. 1) commands a selected flow rate of the fluid from the pump 112. The selected flow rate generally depends on what application the HPS 100 is performing. Whatever drives the determination of the selected flow rate, the controller 126 also operates the motor 110 at a selected speed so that at the selected flow rate the pump 112 operates at optimal efficiency. In these depicted illustrative embodiments the controller 126 wirelessly receives parametric data transmissions from the HPS 100 and transmits command signals to the HPS 100 via a computer network 110. These network communication links can be established such as via radio frequency (RF) communications, although the contemplated embodiments are not so limited.

In these illustrative embodiments the wireless network communications include data from transmitting temperature sensors. Transmitting temperature sensors 128, 130 inform the controller 126 of the temperatures of the motor outboard bearing and the motor inboard motor bearing, respectively. Another transmitting temperature sensor 132 similarly informs the controller 126 of the motor winding temperature.

The wireless network communications also include data from transmitting pressure sensors. A transmitting pressure sensor 134 informs the controller 126 of the pressure of the liquid entering the suction inlet of the pump. Another transmitting pressure sensor 136 informs the controller 126 of the pressure of the fluid leaving the discharge outlet 118. Yet another transmitting pressure sensor (not depicted) informs the controller 126 of the line pressure in whatever is connected to the pump assembly 100, be it a pipeline, a distribution header, a reservoir, and the like, downstream of the flow control valve 124. The wireless network communications can also include other data inputs, such as but not limited to a transmitting vibration sensor 138 indicating the magnitude of motor shaft and/or pump shaft vibration.

Figure 3:
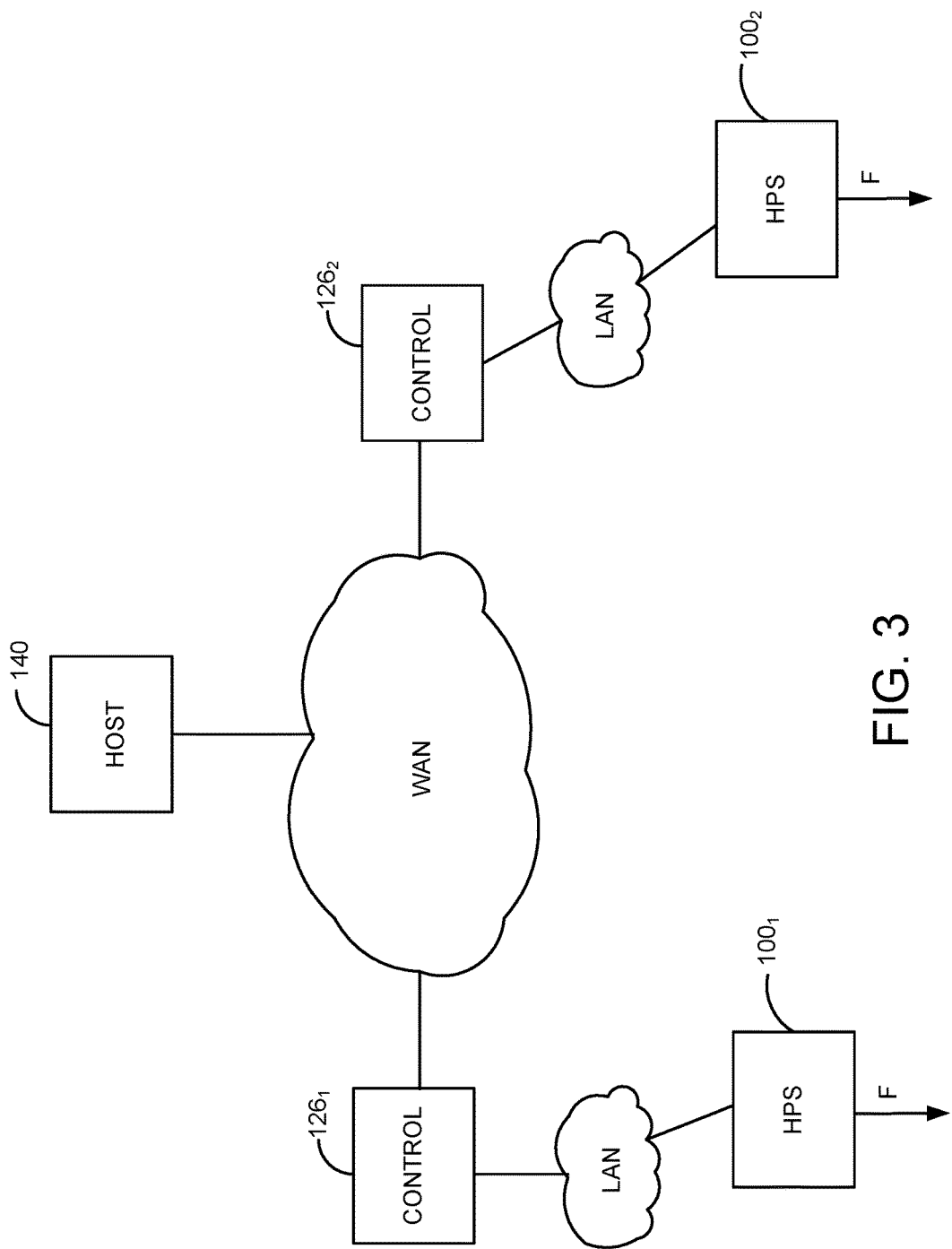
FIG. 3 is a block diagram of a distributed control system of two HPSs communicating via a network connection.

FIG. 3 is a functional block depiction of a host device 140 communicating via a wide area network, such as the Internet, with two controllers 1261, 1262. Each controller 126 includes a processor-controlled communications module establishing a network connection for supervisory control and data acquisition system with the number of transmitting elements of the HPS 100. For example, without limitation, the communications module interfaces with the transmitting elements via an Ethernet bridge operating at a non-standard frequency and with encoded data transmissions.

Returning to FIG. 1, some exemplary transmitting elements of the HPS 100 include motor bearing temperature sensors 128, 130, motor winding temperature sensor 132, the motor/shaft vibration sensor 138, suction pressure sensor 134, and discharge pressure sensor 136. Turning to FIG. 2, some exemplary transmitting elements of the FCS 104 include output from the flow rate meter 122 indicating flow rate, and output from the control valve 124 indicating the valve position (such as percent open).

Figure 4:
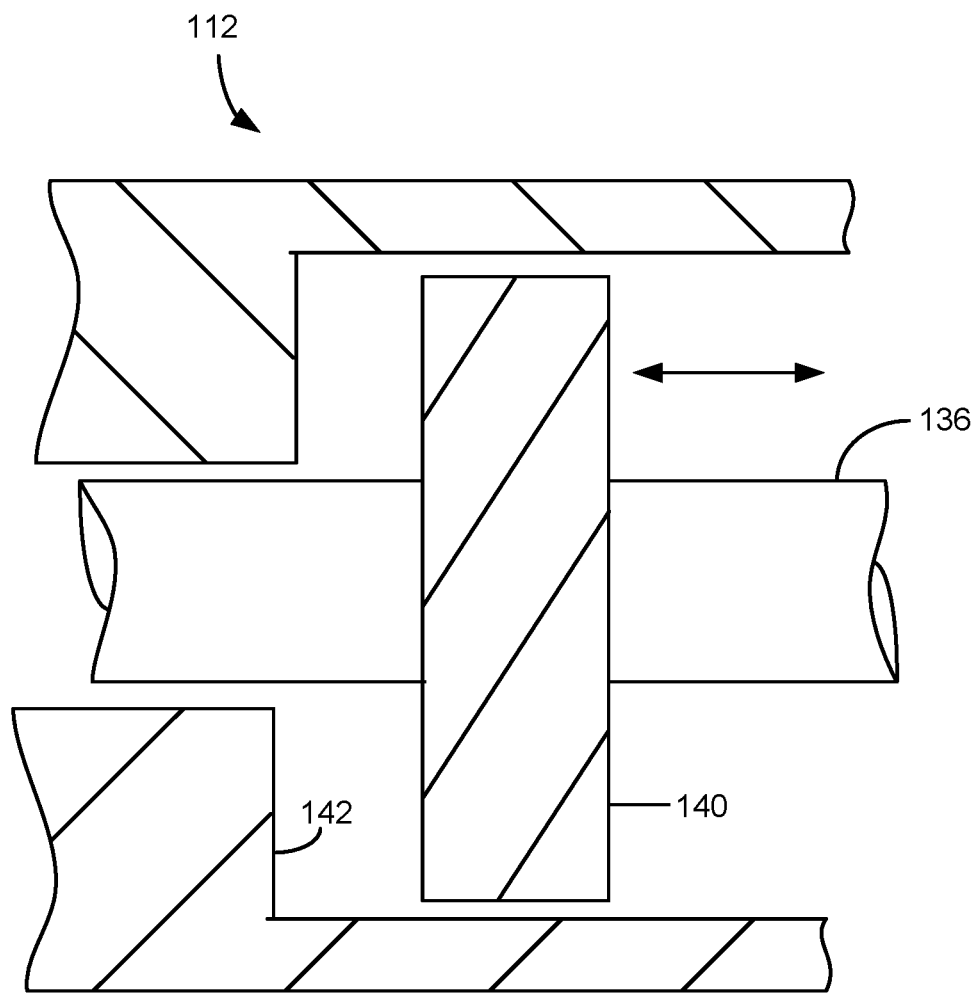
FIG. 4 is a diagrammatic depiction of a rotating impeller and a stationary diffusor in the pump of the HPS of FIG. 1.

FIG. 4 diagrammatically depicts one of the multiple pumping stages in the pump 112. Each stage has an impellor 140 that is rotated by a shaft 136 connected to the output shaft of the motor 110. Each stage also has a stationary diffuser 142 through which the impellor 134 pumps fluid. The impellor 140 has a freedom of longitudinal displacement in the directions of the double-headed arrow. The distance between the impellor 140 and the diffuser 142 varies in relation to the pressure created by the impellor 140 (head). The pump manufacturer provides pump efficiency curves, that specify maximum and minimum operating head for a given flow rate. Operating the pump 112 outside these limits results in adverse wear and tear on the pump 112 and reduced operating life.

Figure 5:
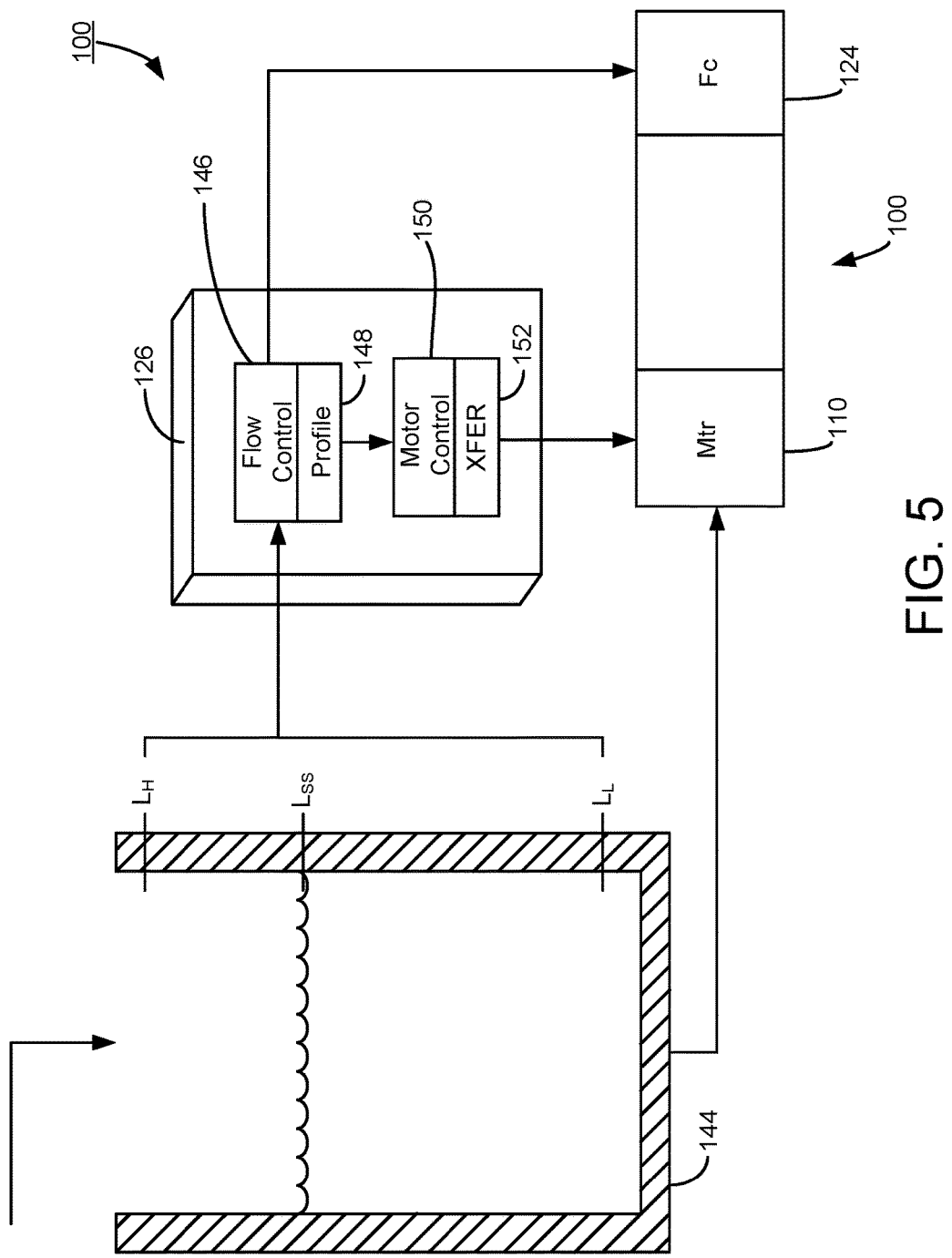
FIG. 5 is a diagrammatic depiction of the HPS of FIG. 1 controlling the level of fluid in a holding tank.

Generally, the present technology provides dynamic control of the HPS 100 so that it can maintain an optimal pumping performance at each of a number of different flow rates. The reason for pumping at different flow rates is dependent on the pump application. For purposes of illustration, FIG. 5 diagrammatically depicts a fluid storage tank 144 that basically serves the function of a fluid buffer in the surface pipeline distribution system. Fluid flows into the fluid storage tank 144, such as from another distant surface pump or a downhole pump, and the HPS 100 pumps the fluid from the fluid storage tank 144 such as to another buffer or into a well. The HPS 100 of this technology can be employed to advantageously maintain a desired steady-state fluid level in the tank 144 by pumping fluid out at various flow rates depending on the fluid flow into the tank 144.

Instantaneous flow rates are determined in relation to a monitored parameter of the fluid in the tank 144. For example, in these illustrative embodiments the tank 144 is equipped with fluid level monitoring equipment, such as fluid detecting elements, to directly measure when the fluid level is at or above certain preselected levels. In these illustrative embodiments three such detectors are installed in the tank 144 to detect when the fluid has reached a maximum desired level, the high level $L_H$, when the fluid has reached a minimum desired level, the low level $L_L$, and when the fluid has reached an intermediate target steady state level $L_{SS}$. In alternative equivalent embodiments the fluid level can be calculated as a static head producing a monitored pressure at a selected position of the tank 144.

Figure 6:
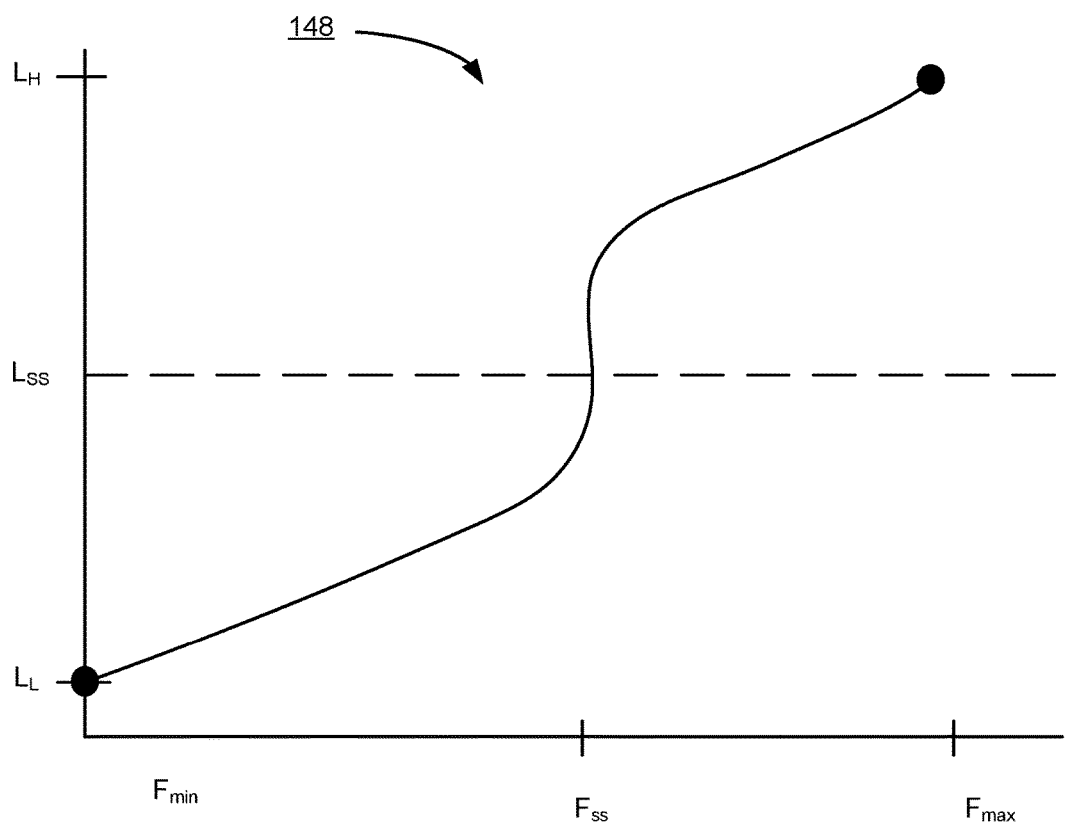
FIG. 6 is a graphical representation of a flow profile stored in memory and indexed to define the flow rate in relation to the level of fluid in the tank.

The controller 126 includes a flow control module 146 that has stored in memory a flow profile 148 used to compensate for fluid level error in the tank 144. The term "fluid level error" for purposes of this description means any deviation from the target $L_{SS}$, either above or below. FIG. 6 diagrammatically depicts an illustrative flow profile trajectory 148 that is stored in memory and indexed by the flow control module 146 to dynamically define the appropriate flow for operating the HPS 100 depending on the presently detected fluid level in the tank between $L_L$ and $L_H$. The minimum flow rate $F_{min}$ and maximum flow rate $F_{max}$ are limited to the adjustability range of the flow control device 124 (FIG. 2).

In these illustrative embodiments the flow profile trajectory 148 has variable flow rate portions at the margins and a substantially constant flow rate portion intersecting the target level $L_{SS}$ in the tank 144. The flow control device 124 can be advantageously sized in relation to the expected fluid flow into the tank 144 so that the HPS 100 can be operated at a constant flow rate within a margin of flow level variation at the $F_{SS}$. That permits compensating for expected process variation without unnecessarily constantly adjusting the flow rate under stead state operating conditions. However, when the fluid level continues to drop even at reduced flow rates below the steady state operating condition, that indicates that fluid intake by the tank 140 is decreased or stopped.

Figure 7:
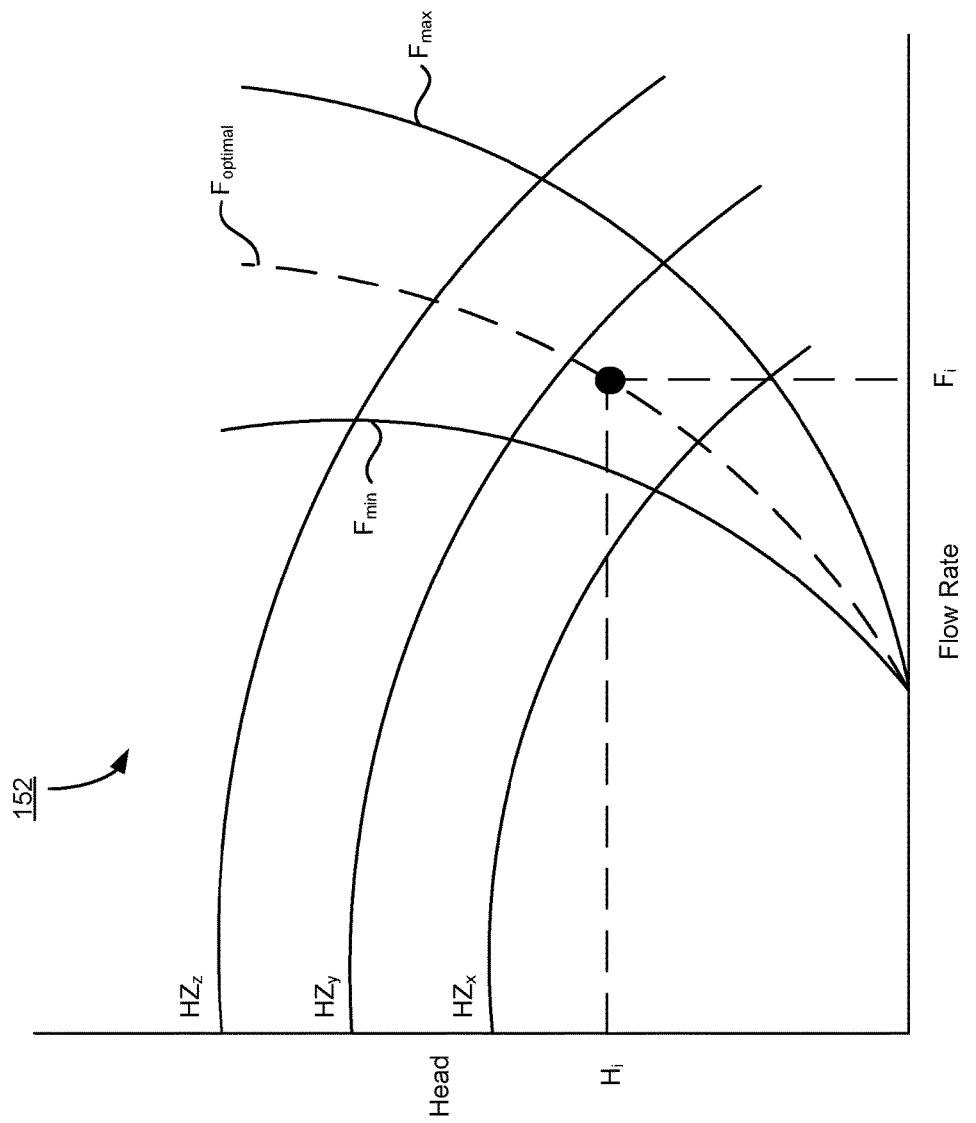
FIG. 7 is a graphical representation of a transformation function stored in memory and indexed to define the motor speed to optimize performance of the pump at a given flow rate.

The flow control 146 provides a process input to a motor controller 150 that adjusts motor 110 speed for the present flow rate to maintain an optimal operating performance of the pump 112. The motor controller 150 indexes a transformation function 152 stored in memory that maps the present flow rate to a selected motor speed. FIG. 7 graphically depicts the construct of an illustrative transformation function that is constructed in accordance with embodiments of this technology. An operating curve is depicted for the HPS 100 that defines the performance range for various flow rates, the operating space between the lower performance boundary $F_{min}$ and the upper performance boundary $F_{max}$. From these boundary curves $F_{min}$ and $F_{max}$, generally defined by the law of affinity, an optimal performance curve $F_{optimal}$ can be mathematically constructed at the midpoint therebetween. The motor controller 150 functions to set the speed of the motor 110 so that the HPS 100 operates along the $F_{optimal}$ curve at all flow rates.

The motor controller 150 calculates the present point on the $F_{optimal}$ curve defined by coordinates of instantaneous flow $F_i$ and head $H_i$. The instantaneous flow $F_i$ is input from the flow control 146, and the instantaneous head $H_i$ is measured in the pump 112, such as at the outlet 127 downstream of the flow control 124. Alternatively, for example, the head $H_i$ can be monitored in a connecting line connected in fluid communication with the outlet 126. The transformation function 152 then interpolates between adjacent motor frequency curves intersecting the $F_{optimal}$ curve to determine what speed to operate the motor 110. Correlating the motor 110 to flow and head advantageously balances the fluid up thrust and down thrust forces acting on the impeller 140 at all the various flow rates, optimizing pump performance and minimizing wear and tear on the pump's internal moving parts.

In some embodiments at the margins the motor control 150 de-energizes the motor 110 when the flow controller calls for $F_{min}$, and only re-energizes the motor 110 again when the motor controller 204 calls for $F_{max}$. When the motor 110 is energized, the flow control 146 and motor control 150 cooperatively modulate the HPS 100 fluid flow to maintain $L_{SS}$ in the tank 144, and in turn modulate the speed of the motor 110, such as by varying the power frequency, to at all times maintain the HPS 100 operating on the $F_{optimal}$ operating curve.

Figure 8:
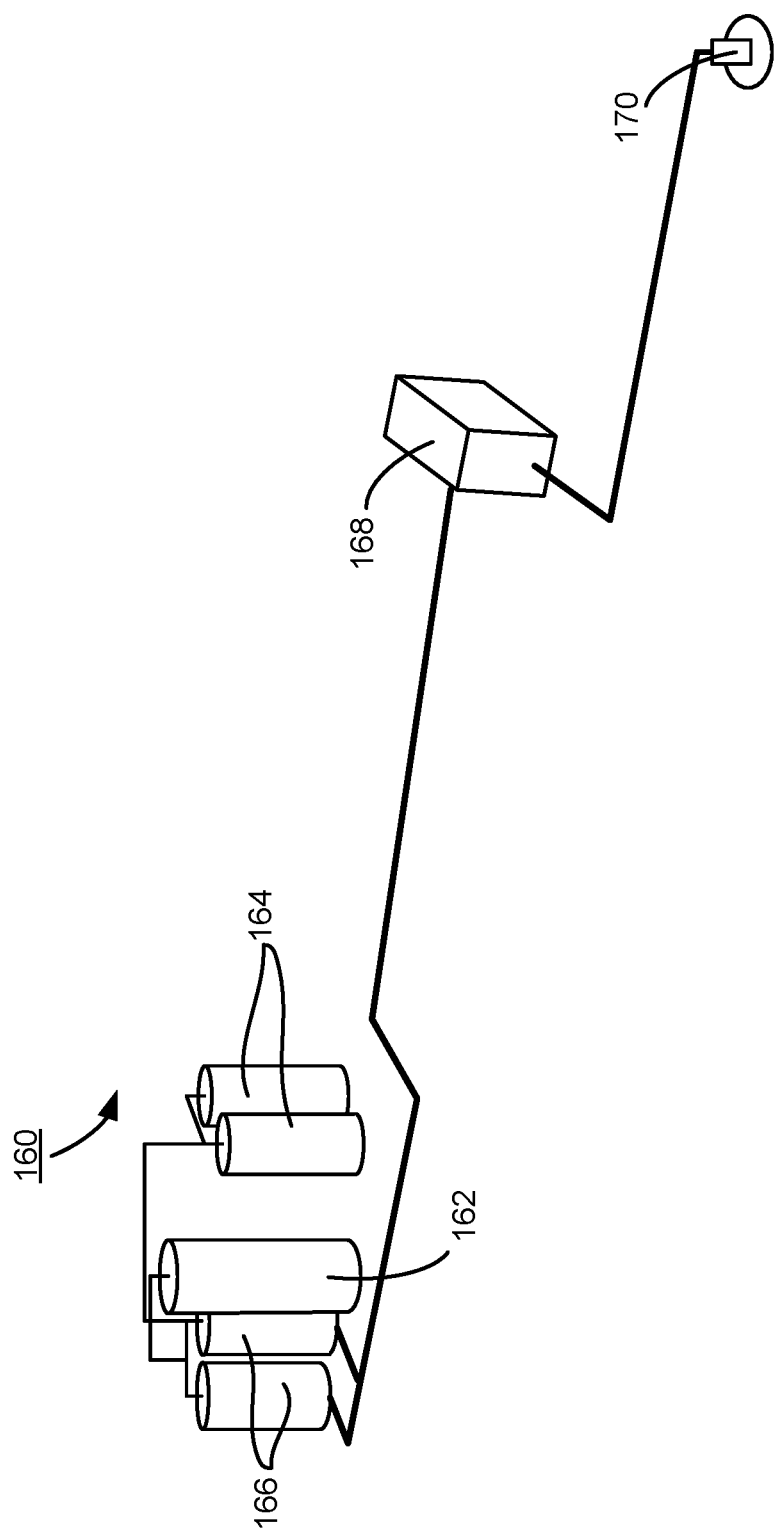
FIG. 8 diagrammatically depicts a saltwater disposal system constructed in accordance with embodiments of this technology.

FIG. 8 diagrammatically depicts pertinent portions of a saltwater disposal (SWD) well 160 that is constructed in accordance with illustrative embodiments of this technology. Class II SWD wells are operated to treat flowback and produced water from an oil and gas well in accordance with governing federal and state regulations. Flowback water is the fluid that returns to the surface after being used to perform subterranean hydraulic fracturing. It can take millions of gallons of fluid to perform the hydraulic fracturing process, and a significant amount of that fluid returns to the surface instead of being absorbed into the formation. The flowback water typically consists of the injected fluid plus clays, metal ions, and various dissolved solids in addition to oil and gas products, so that the recovery can offset the costs of treating and disposing of the flowback water. Produced water is the naturally-occurring fluid residing in the hydrocarbon formation that flows to the surface along with the produced oil and gas products.

The flowback and produced water is typically trucked to the SWD well which is equipped with truck bays (not depicted) for connecting to a wash tank (sometimes called a gun barrel tank) 162. To minimize trucking costs and delays it is advantageous to locate the SWD well 160 in the proximity of existing and expected drilling activities. The oil and water are mechanically and chemically treated to facilitate the separation of oil-laden products into oil skim tanks 164 and saltwater into saltwater disposal tanks 166. Pumps depicted within a pump house 168 are selectively activated to transfer the saltwater from the tanks 166 to an injection well 170 drilled deeply below and safeguarded away from freshwater aquifers. Currently there are about 50,000 active SWD disposal wells operating in the United States in this manner to dispose of flowback and produced water in accordance with governing environmental regulations.

Figure 9:
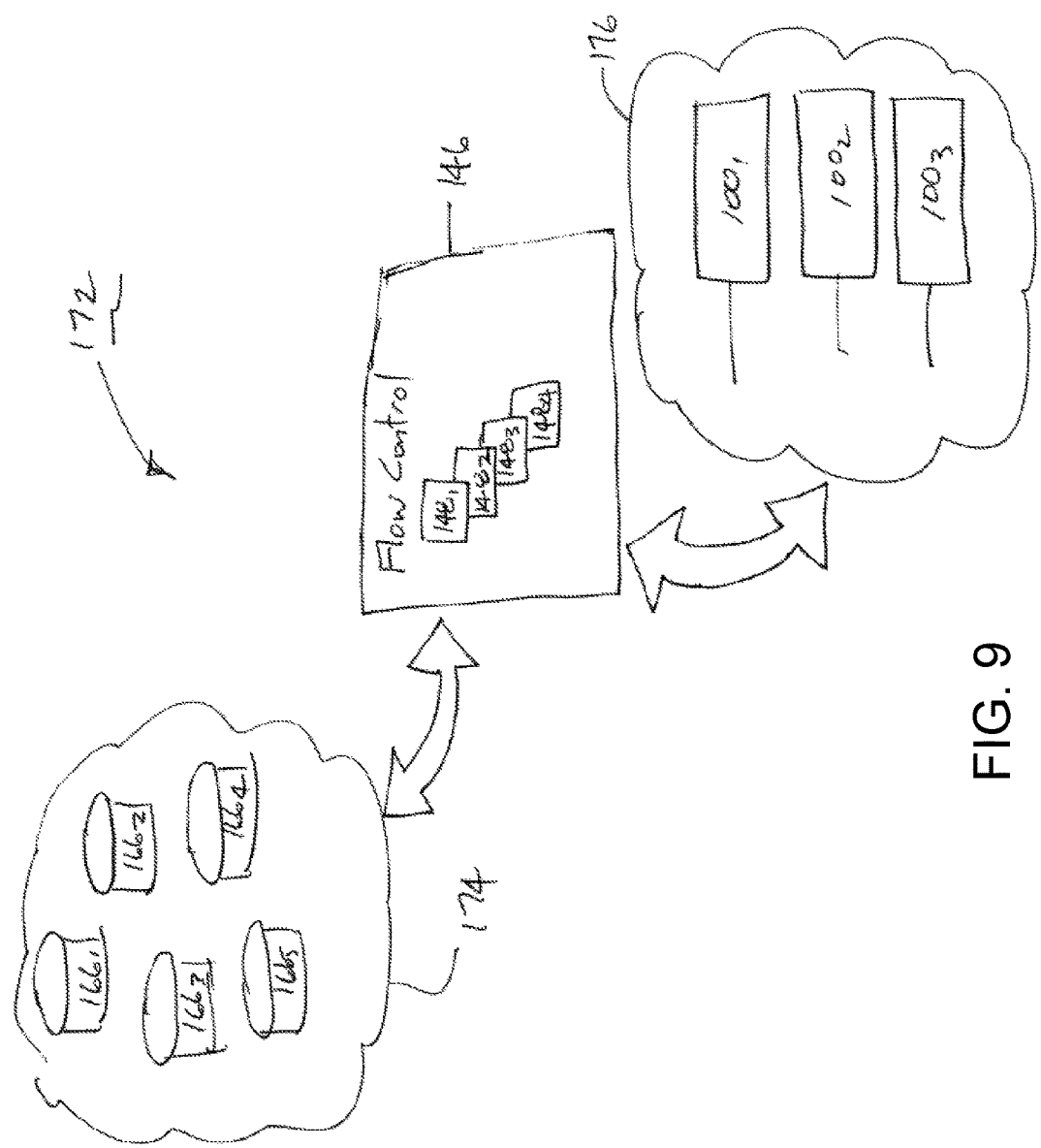
FIG. 9 diagrammatically depicts the saltwater disposal system of FIG. 8.

FIG. 9 diagrammatically depicts a SWD disposal system 172 that is constructed in accordance with this technology. The flow control 146 (see FIG. 5) receives fluid level signals from each of the saltwater disposal tanks $166_n$ and uses one or more stored profiles 148 to call for a respective discharge flow rate of fluid. In these illustrative embodiments the fluid level signals can be transmitted and received wirelessly, although the contemplated embodiments are not so limited. If the tanks 166 are similarly constructed and operated then one profile 148 can be used for calculating each of the individual tank discharge flow rates. For example, if the $L_H$, $L_{SS}$, and $L_L$ levels are the same for two different tanks 166 then determining the tank discharge flow rate according to the same profile 148 can simplify programming. If, on the other hand, one or more of the tanks 166 is to be operated differently then custom profiles $148_n$ can be stored in memory and referenced individually.

The flow control 146 also communicates individually with each of a plurality of the HPSs $100_n$ to pump the fluid from the tanks 166. Although HPSs 100 are depicted in these illustrative embodiments, the contemplated embodiments are not so limited because in other embodiments different types of pumps can be used. In any event, the flow control 146 can be programmed to sequence the pumps 100 according to predetermined rules designed to maximize operating efficiency and extend operating life of each pump 100. For example, the flow control 146 can be programmed to remove a pump 100 from service if a parametric value, such as the monitored bearing temperature, drifts out of an expected range. In that event the flow control 146 would have only two pumps 100 to work with instead of the three depicted. In another example, the flow control 146 can be programmed to remove the pumps from service for scheduled maintenance operations or other predictive failure indications.

Advantageously, the flow control 146 is programmed to consider the plurality of tanks $166_n$ as a virtually collective tank pod 174 with a total discharge flow rate that is substantially the sum of the individual discharge flow rates according to the instantaneous fluid levels in the tanks. Similarly, the flow control 146 is programmed to consider the plurality of pumps $100_n$ as a virtually collective pump pod 176 providing an aggregate pumping resource. That advantageously eliminates any need to individually assign a particular pump 100 to discharge fluid from any particular tank 166.

For example, if the controller 146 (according to the fluid level signals and profile(s) 148) is calling to pump 100 gallons per minute (GPM) from tank $166_1$ and 200 GPM from tank $166_2$, then by implementing the predetermined rules it could call for pump $100_1$ to pump 300 GPM or it could equivalently call for each of the pumps $100_1$, $100_2$, $100_3$ to pump 100 GPM each. The skilled artisan readily ascertains the details of piping and valving that would be involved in deciding to use one pump 100 as opposed to three pumps 100 to evacuate two tanks $166_1$, $166_2$, so a detailed description of the interconnecting pipeworks is not necessary for the skilled artisan to understand the scope of the claimed invention.

Figure 10:
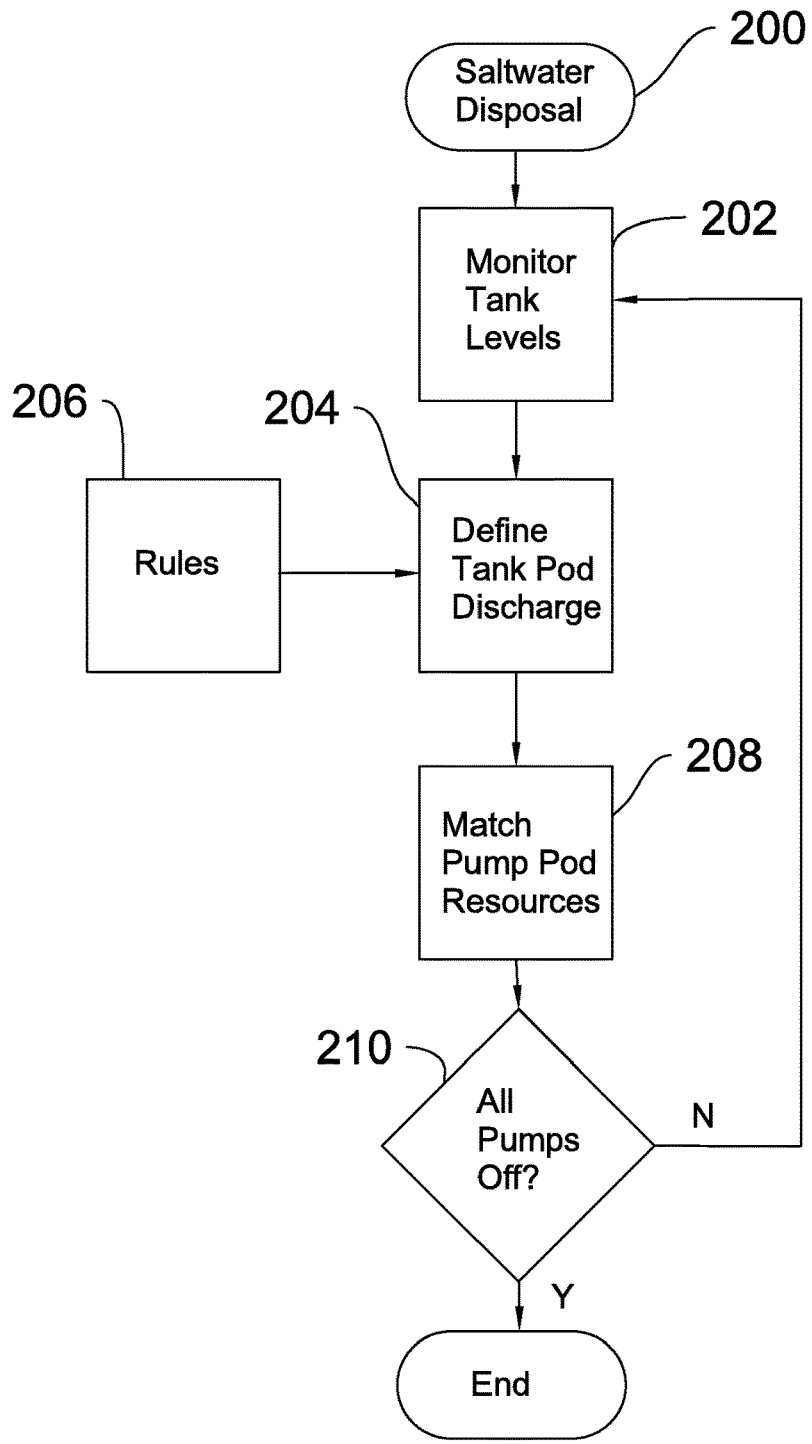
FIG. 10 depicts a flowchart of steps in a method for SALTWATER DISPOSAL in accordance with this technology.

FIG. 10 is a flow chart of steps in a method 200 for SALTWATER DISPOSAL in accordance with illustrative embodiments of this technology. The method begins in block 202 with the controller monitoring instantaneous tank levels. In block 204, those tank levels are applied to the applicable stored flow profile(s) to define the collective tank pod 172 discharge flow rate requirement. In response to predefined rules 206, control passes to block 208 where the pump pod 174 resources are matched to the discharge flow rate requirement by selectively activating or deactivating pumps 100 in the pump pod 174. In block 210 it is determined whether all pumps 100 are off. If the determination of block 210 is "no," then control returns to block 202 for continued operation as described.

The various features and alternative details of construction of the apparatuses described herein for the practice of the present embodiments will readily occur to the skilled artisan in view of the foregoing discussion, and it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present embodiments.

What is claimed:

1. A saltwater disposal system, comprising:
   a tank pod containing a plurality of tanks, each tank configured to transmit an instantaneous fluid level signal indicating a level of fluid in the respective tank;
   a pump pod containing a plurality of individually controllable pump systems, each pump system including:
     a multiple stage pump having an inlet that is connected for selective fluid communication with an outlet of each of the tanks;
     a motor operably rotating the pump stages to pressurize the fluid in the pump, moving the pressurized fluid toward an outlet of the pump;
     a motor controller operably indexing a transformation function that is stored in computer memory relating an instantaneous pump flow rate to a corresponding preferred speed of the motor that optimizes the pump's performance, and selectively varying the motor speed in relation to the transformation function;
     a flow control device fluidly connected to the pump's outlet, so that substantially all of the pressurized fluid flows through the flow control device, and
   a flow controller executing computer instructions stored in a computer memory that are responsive to each of the fluid level signals and a stored flow profile that varies pump flow rate in relation to instantaneous tank fluid level, to collectively define a discharge flow rate for the tank pod, and to selectively activate the pumps according to predetermined operating rules to individually adjust each pump system's respective flow controller and motor controller to collectively match the pump flow rates to the discharge flow rate for the tank pod.

2. The system of claim 1 wherein the tank pod includes a gun barrel tank.

3. The system of claim 1 wherein the tank pod includes an oil skim tank.

4. The system of claim 1 wherein the tank pod includes a saltwater disposal tank.

5. The system of claim 1 wherein the pump pod is connected to an injection well.

6. The system of claim 1 comprising a first stored flow profile corresponding to one of the tanks in the tank pod and a second stored flow profile corresponding to another one of the tanks in the tank pod.

7. The system of claim 1 wherein the predetermined operating rules monitors a parametric value, and removes one of the pumps in the pump pod from service in response a change in the parametric value.

8. The system of claim 7 wherein the parametric value is a temperature.

9. The system of claim 7 wherein the parametric value is a pressure.

10. The system of claim 7 wherein the parametric value is a vibration.

11. The system of claim 1 wherein the predetermined operating rules reflect scheduled maintenance operations.

12. The system of claim 1 wherein the predetermined operating rules reflect predictive failure indications.

13. A saltwater disposal system, comprising:
    a tank pod containing a plurality of tanks, each tank configured to transmit an instantaneous fluid level signal indicating a level of fluid in the respective tank;
    a pump pod containing a plurality of individually controllable pump systems, each pump system including:
      a multiple stage pump having an inlet that is connected for selective fluid communication with an outlet of each of the tanks;
      a motor operably rotating the pump stages to pressurize the fluid in the pump, moving the pressurized fluid toward an outlet of the pump;
      a motor controller operably indexing a transformation function that is stored in computer memory relating an instantaneous pump flow rate to a corresponding preferred speed of the motor that optimizes the pump's performance, and selectively varying the motor speed in relation to the transformation function;
      a flow control device fluidly connected to the pump's outlet, so that substantially all of the pressurized fluid flows through the flow control device, and
    a flow controller executing computer instructions stored in a computer memory to collectively define a discharge flow rate for the tank pod, and to selectively activate the pumps according to predetermined operating rules to individually adjust each pump system's respective flow controller and motor controller to collectively match the pump flow rates to the discharge flow rate for the tank pod.

14. A saltwater disposal system, comprising:
    a tank pod containing a plurality of tanks, each tank configured to transmit an instantaneous fluid level signal indicating a level of fluid in the respective tank;
    a pump pod containing a plurality of individually controllable pump systems, each pump system including:
      a multiple stage pump having an inlet that is connected for selective fluid communication with an outlet of each of the tanks;
      a motor operably rotating the pump stages to pressurize the fluid in the pump, moving the pressurized fluid toward an outlet of the pump;
      a motor controller configured to selectively vary the speed of the motor;
      a flow control device fluidly connected to the pump's outlet, so that substantially all of the pressurized fluid flows through the flow control device, and
    a flow controller executing computer instructions stored in a computer memory that are responsive to each of the fluid level signals and a stored flow profile that varies pump flow rate in relation to instantaneous tank fluid level, to collectively define a discharge flow rate for the tank pod, and to selectively activate the pumps according to predetermined operating rules to individually adjust each pump system's respective flow controller and motor controller to collectively match the pump flow rates to the discharge flow rate for the tank pod.

\* \* \* \* \*